United States Patent
Ishii

(10) Patent No.: US 8,515,430 B2
(45) Date of Patent: Aug. 20, 2013

(54) WIRELESS COMMUNICATION SYSTEM, BASE STATION, WIRELESS COMMUNICATION METHOD, AND PROGRAM

(75) Inventor: Naoto Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 262 days.

(21) Appl. No.: 12/866,228

(22) PCT Filed: Feb. 16, 2009

(86) PCT No.: PCT/JP2009/052476
§ 371 (c)(1),
(2), (4) Date: Aug. 4, 2010

(87) PCT Pub. No.: WO2009/122783
PCT Pub. Date: Oct. 8, 2009

(65) Prior Publication Data
US 2011/0009154 A1    Jan. 13, 2011

(30) Foreign Application Priority Data
Apr. 1, 2008 (JP) ................................ 2008-095103

(51) Int. Cl.
*H04W 36/00* (2009.01)
(52) U.S. Cl.
USPC ......................................... 455/443; 455/522
(58) Field of Classification Search
USPC ............ 455/450, 451, 452.1, 453, 454, 13.4, 455/522, 443
See application file for complete search history.

(56) References Cited

U.S. PATENT DOCUMENTS

2006/0094440 A1 * 5/2006 Meier et al. ................. 455/453
2007/0253355 A1   11/2007 Hande et al.

FOREIGN PATENT DOCUMENTS

| CN | 101001405 A | 7/2007 |
|---|---|---|
| CN | 101064904 A | 10/2007 |
| CN | 101132202 A | 2/2008 |
| JP | 2001292097 A | 10/2001 |
| JP | 2003188818 A | 7/2003 |
| JP | 2003318816 A | 11/2003 |
| JP | 2006033826 A | 2/2006 |
| JP | 2006287895 A | 10/2006 |
| JP | 2007329613 A | 12/2007 |
| JP | 2009-512361 A | 3/2009 |
| WO | 2007047669 A1 | 4/2007 |
| WO | 2007047670 A | 4/2007 |

OTHER PUBLICATIONS

International Search Report for PCT/JP2009/052476 mailed Apr. 28, 2009.

(Continued)

*Primary Examiner* — Tu X Nguyen

(57) ABSTRACT

A wireless communication system according to the present invention includes a first base station forming a unicast area and a second base station forming a multicast area. The first base station is provided with a load status reporting unit for reporting the load status of the unicast area of the first base station to the second base station forming the multicast area within a certain distance from the unicast area of the first base station. The second base station is provided with a transmission power controlling unit for controlling, based on the reported load status of the unicast area, the transmission power of a signal transmitted in the multicast area of the second base station.

19 Claims, 4 Drawing Sheets

(56) References Cited

OTHER PUBLICATIONS

Nokia Siemens Networks, Nokia, Huawei, "Signaling of MBSFN subframe allocation in D-BCH", 3GPP TSG-RAN WG1 Meeting #49bis, R1-072963, Jun. 2007.

Chinese Office Action for CN200980109185.7 dated Oct. 8, 2012.
Lucent Technologies, "Uplink Scheduling With Inter-cell Interference Control", 3GPP TSG-RAN WG 2 #55 R2-062814, Oct. 13, 2006.
Japanese Office Action for JP 2010-505440 mailed on Jun. 25, 2013 with Partial English Translation.

* cited by examiner

WIRELESS COMMUNICATION SYSTEM, BASE STATION, WIRELESS COMMUNICATION METHOD, AND PROGRAM

The present invention is the National Phase of PCT/JP2009/052476, filed Feb. 16, 2009, which claims priority on Japanese Patent Application No. 2008-095103 filed on Apr. 1, 2008, the entire contents of which are hereby incorporated by reference.

TECHNICAL FIELD

The present invention relates to techniques for controlling the transmission power of a downlink signal in a downlink transmitted from a base station to a wireless communication terminal (hereinafter, referred to as terminal) in a wireless communication system.

BACKGROUND ART

In a wireless communication system, a plurality of base stations are deployed, and each of the base stations communicates with a terminal within the communication area of the base station itself. This communication area is called a cell.

In the wireless communication system, in order to increase the number of terminals, to which the base station simultaneously communicates, the cell can be divided by providing the transmission antenna of the base station with directivity. The division of the cell is called a sector.

When a plurality of cells use the same frequency, the communication quality of the cells may be degraded by interference from adjacent cells.

Similarly, when a plurality of sectors use the same frequency, the communication quality of the sectors may be degraded by interference from adjacent sectors.

It is generally considered that the interference from an adjacent sector is sufficiently reduced by directivity of the transmission antenna. But in fact, if the sectors are at the same distance from the base station, the sectors have equal interference without regard to the directivity; therefore, the interference is not reduced and degradation of the communication quality is not removed.

As a technique for reducing the interference from an adjacent cell, a technique for reducing the interference from the adjacent cell in a downlink of the OFDMA (Orthogonal Frequency Division Multiple Access) is described in Patent Document 1, for example.

According to the technique described in Patent Document 1, a central entity connected to a plurality of base stations allocates a frequency group to each base station, and further allocates the frequency group of each base station to terminals in a cell. The allocation of wireless resources (frequency) is called 'scheduling.' Each terminal measures the reception power of a pilot signal from each base station, and the central entity does the scheduling based on the reception power reported from each terminal. When a terminal is located at the cell boundary within a cell of a base station, the adjacent cell transmits signals with reduced transmission power uniformly toward the terminals in the cell of itself, to which the same frequency group as that of the terminal is allocated.

With the technique described in Patent Document 1 applied to the adjacent sector, when a terminal is located at the sector boundary within a sector, a base station will transmit signals with reduced transmission power uniformly toward the terminals in the adjacent sector, to which the same frequency group as that of the terminal is allocated.

Here, the communication area of the base station is largely divided into a multicast area for transmitting the same signal to a plurality of terminals and a unicast area for transmitting a signal unique to a terminal.

When the minimum unit of the communication area of the base station is a cell, the multicast area and the unicast area are a multicast cell and a unicast cell divided by cell, and when the minimum unit of the communication area of the base station is a sector, they are a multicast sector and a unicast sector divided by sector.

Here, it is assumed that the minimum unit of the communication area of the base station is a cell and a unicast cell is adjacent to a multicast area consisting of a plurality of multicast cells.

In the circumstances, since the signals transmitted from the multicast cells forming the multicast area are the same and since the correlation of the signals is strong, the interference from the multicast area to the unicast cell is stronger than that from other adjacent unicast cells.

Since the communication quality of the unicast cell is degraded as it is largely affected by the interference from the multicast area, the interference from the multicast area needs to be reduced to maintain the communication quality.

But as the technique described in Patent Document 1 simply decreases the transmission power toward the adjacent cells without distinguishing the unicast cell and the multicast cell, it has a problem in that the interference from the multicast area is not sufficiently reduced.

Besides, as the multicast cell continuously performs the transmission in general, the technique has a problem in that, if the transmission power of the multicast cell is always decreased, the multicast cell is always made small.

DISCLOSURE OF THE INVENTION

An object of the present invention is to provide a wireless communication system, base station, wireless communication method, and program for solving the above-mentioned problems.

The wireless communication system according to the present invention is a wireless communication system including a first base station forming a unicast area and a second base station forming a multicast area, wherein the first base station includes:

a load status reporting unit for reporting a load status of the unicast area of the first base station to the second base station forming the multicast area within a certain distance from the unicast area of the first base station, and the second base station includes:

a transmission power controlling unit for controlling, based on the reported load status of the unicast area, the transmission power of a signal transmitted in the multicast area of the second base station.

The first base station according to the present invention is a base station forming a unicast area, including a load status reporting unit for reporting a load status of the unicast area of the base station itself to another base station forming a multicast area within a certain distance from the unicast area of the base station itself.

The second base station according to the present invention is a base station forming a multicast area, including a transmission power controlling unit for controlling, based on the load status of a unicast area reported from a base station forming the unicast area, the transmission power of a signal transmitted in the multicast area of the base station itself.

The first wireless communication method according to the present invention is a wireless communication method by a wireless communication system including a first base station forming a unicast area and a second base station forming a multicast area, including:

a load status reporting step in which the first base station reports the load status of the unicast area of the first base station to the second base station forming the multicast area within a certain distance from the unicast area of the first base station, and a transmission power controlling step in which the second base station controls, based on the reported load status of the unicast area, the transmission power of a signal transmitted in the multicast area of the second base station.

The second wireless communication method according to the present invention is a wireless communication method by a base station forming a unicast area, including a load status reporting step in which the base station reports the load status of the unicast area of the base station itself to another base station forming a multicast area within a certain distance from the unicast area of the base station itself.

The third wireless communication method according to the present invention is a wireless communication method by a base station forming a multicast area, including a transmission power controlling step in which the base station controls, based on the load status of a unicast area reported from a base station forming the unicast area, the transmission power of a signal transmitted in the multicast area of the base station itself.

The first program according to the present invention causes a base station forming a unicast area to execute a load status reporting process of reporting the load status of the unicast area of the base station itself to another base station forming a multicast area within a certain distance from the unicast area of the base station itself.

The second program according to the present invention causes a base station forming a multicast area to execute a transmission power controlling process of controlling the transmission power of a signal transmitted in the multicast area of the base station, based on the load status of a unicast area reported from a base station forming the unicast area.

According to the present invention, the first base station reports the load status of a unicast area of the first base station to the second base station forming a nearby multicast area within a certain distance from the unicast area from the first base station, and the second base station controls the transmission power of the signal transmitted in the multicast area of the second base station based on the load status of the nearby multicast area.

Accordingly, as the transmission power is decreased for the multicast area within a certain distance from the unicast area, the present invention has the advantage of reducing the interference from the multicast area to the unicast area.

Further, as the second base station decreases the transmission power according to the load status of the nearby unicast area, the present invention has the advantage of preventing the second base station from always decreasing the transmission power, thus, the advantage of preventing the multicast area of the second base station from always being made small.

BEST MODE FOR CARRYING OUT THE INVENTION

The best mode for carrying out the present invention will be described below with reference to the drawings.

Exemplary embodiments below will be described by taking an example of a case in which the wireless communication system is a LTE (Long Term Evolution) wireless communication system of 3GPP ($3^{rd}$ Generation Partnership Project), but the present invention is not limited to the example and can be applied to a wireless communication system of another communication system including WIMAX (Worldwide Interoperability for Microwave.) Here, in the downlink of LTE, OFDMA is adopted as the wireless access system.

The exemplary embodiments will be described by taking an example of a case in which the minimum unit of the communication area of the base station is a cell and the multicast area and the unicast area are a multicast cell and a unicast cell, respectively, but the present invention is not limited to the example and can be applied to the case in which the multicast area and the unicast area are a multicast sector and a unicast sector, respectively.

Figure 1:
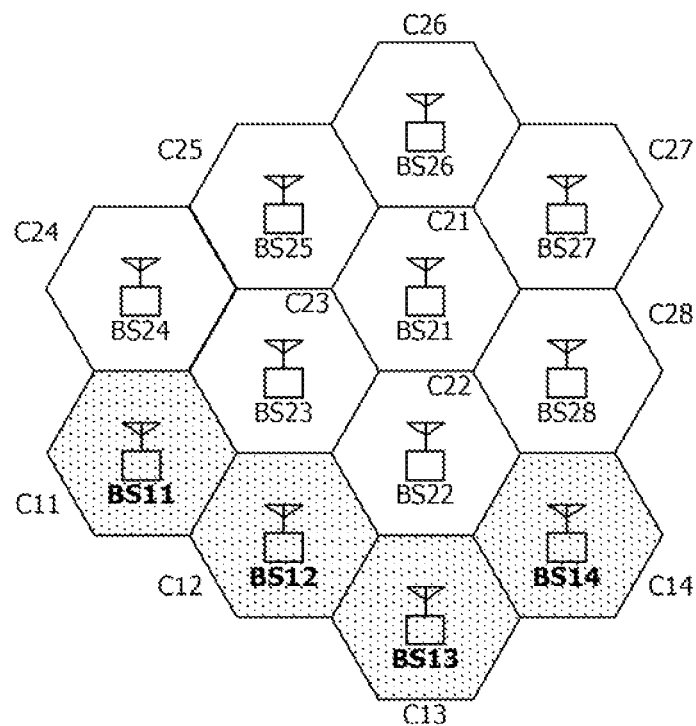
FIG. 1 is a diagram showing a configuration of a wireless communication system according to the first exemplary embodiment of the present invention.

Referring to FIG. 1, the wireless communication system of the exemplary embodiment is provided with base stations BS11~BS14, BS21~BS28.

Base stations BS11~BS14 respectively form cells C11~C14, each of which is a unicast cell for transmitting a signal unique to a terminal.

Base stations BS21~BS28 respectively form cells C21~C28, which are multicast cells for transmitting the same signal to a plurality of terminals.

For simplicity of expression, all the terminals located in cells C11~C14 and cells C21~C28 are omitted in FIG. 1. The number of base station BS and the arrangement of the cell in FIG. 1 are merely an example, and the present invention is not limited to them. Although it is not shown in the figure, base stations BS11~BS14, BS21~BS28 are connected with each other via a network so that they can transmit and receive signals.

In the LTE, the system band is divided by frequency block (RB: Resource Block) and the resulting RBs are allocated to terminals as wireless resources.

The configurations of base stations BS11~BS14, which form the unicast cells, and base stations BS21~BS28, which form the multicast cells, will be described with reference to FIG. 2. The configurations of base station BS11 and base station BS21 will be explained as examples below.

Figure 2:
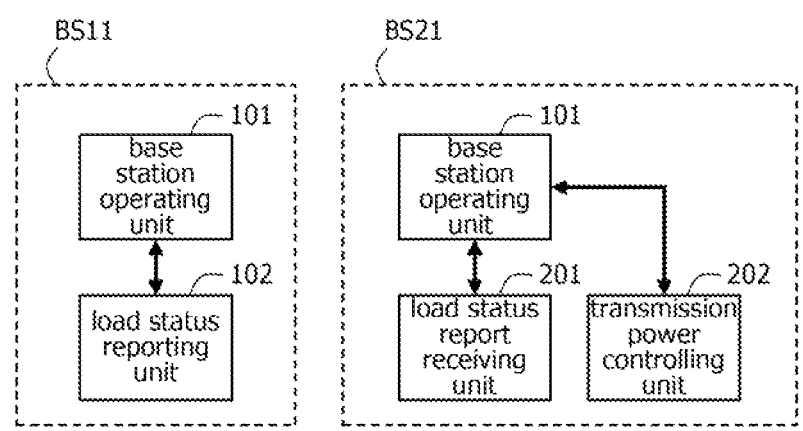
FIG. 2 is a diagram showing a configuration of a base station according to the first exemplary embodiment of the present invention.

Referring to FIG. 2, base station BS11, which forms cell C11, a unicast cell, is provided with base station operating unit 101 and load status reporting unit 102.

Base station operating unit 101 has functions equivalent to those of a base station that is generally used in a LTE system, including, for example, a function of transmitting a downlink signal to a terminal located in cell C11. As the configuration and operation of the base station operating unit 101 are known, detailed description thereof will be omitted.

Load status reporting unit 102 has a function of measuring the load status of cell C11, and reporting the measured load status of cell C11 to base station BS, which forms a nearby multicast cell within a certain distance from cell C11. Here, it is assumed that information on the nearby multicast cells within a certain distance from cell C11 is previously set in load status reporting unit 102 so that load status reporting unit 102 can judge the multicast cell that receives the report of the load status, based on the information.

Referring to FIG. 2, base station BS21, which forms cell C21, a multicast cell, is provided with base station operating unit 101, load status report receiving unit 201, and transmission power controlling unit 202.

Base station operating unit 101 is the same as base station operating unit 101 in base station BS11.

Load status report receiving unit 201 has a function of receiving a load status report from a nearby unicast cell.

Transmission power controlling unit 202 has a function of controlling the transmission power of a downlink signal transmitted from cell C21, based on the load status of the nearby unicast cell.

The load status reporting operation by base stations BS11~BS14, which form unicast cells, and the transmission power controlling operation by base stations BS21~B28, which form multicast cells, will be described below.

First, the load status reporting operation by base stations BS11~BS14, which form unicast cells, will be described with reference to FIG. 3.

In the description below, it is assumed that base stations BS11~BS14 are subject to reporting the load status from the unicast cells of the base stations themselves to the nearby multicast cells within a certain distance from the unicast cells of the base stations themselves and the multicast cells adjacent to these multicast cells. That is, in the example shown in FIG. 1, base station BS11 reports the load status to base stations BS21~BS25. But the above-mentioned example of nearby multicast cells is merely an example, and the base station may report only to the multicast cells adjacent to the unicast cell.

Figure 3:
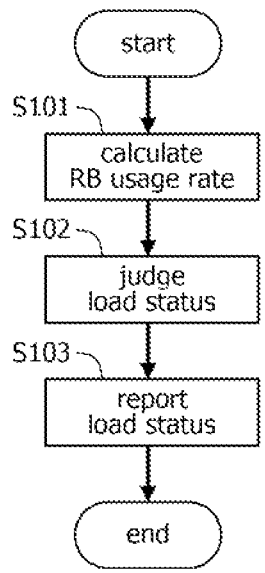
FIG. 3 is a flow chart for explaining the load status reporting operation by the base station according to the first exemplary embodiment of the present invention.

Referring to FIG. 3, in each of bases stations BS11~BS14, first in step S101, load status reporting unit 102 calculates the usage rate of RB.

Here, the usage rate of RB is measured on a predetermined cycle to be an indicator representing the average frequency of the system band used in the cycle. For example, if the entire system band is always used, the usage rate of RB is 100%.

Next in step S102, load status reporting unit 102 judges the present load status based on the measured usage rate of RB.

Then in step S103, load status reporting unit 102 reports the present load status to the multicast cells adjacent to the unicast cell of the base station itself and multicast cells adjacent to these multicast cells.

Now, the transmission power controlling operation by each of base stations B21~B28, which form multicast cells, will be described with reference to FIG. 4.

Figure 4:
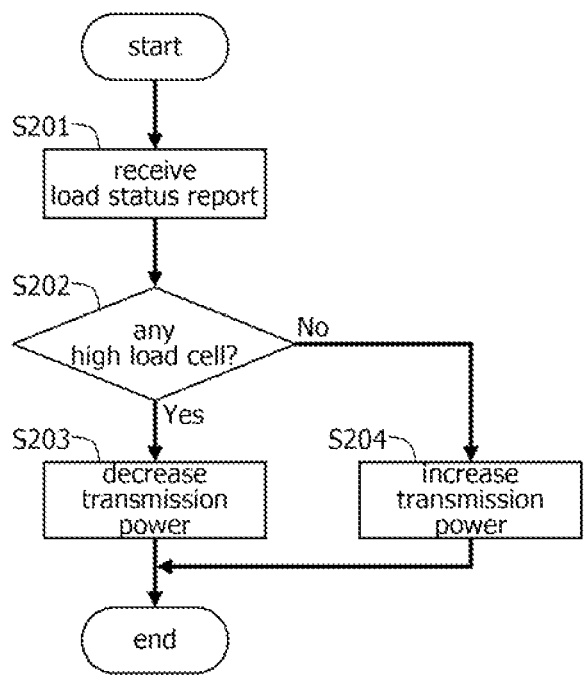
FIG. 4 is a flow chart for explaining the transmission power controlling operation by the base station according to the first exemplary embodiment of the present invention.

Referring to FIG. 4, in each of base stations BS21~BS28, first in step S201, load status report receiving unit 201 receives the load status report from the unicast cells adjacent to the multicast cell of the base station itself and the unicast cells adjacent to the multicast cells adjacent to the multicast cell of the base station itself.

Next in step S202, transmission power controlling unit 202 totals the reported load status and judges whether the unicast cell showing a high load is present or not.

Here, it may be judged that the load status at a predetermined load or over is the high load, and the load status less than a predetermined load is the low load; for example, when the reported load status is represented by either one of the two values of H and L, H may be judged to be the high load and L may be judged to be the low load.

If the load status of at least a unicast cell shows the high load at step S202, transmission power controlling unit 202 decreases the transmission power of a downlink signal transmitted from the multicast cell of the base station itself in step S203.

On the other hand, if the load status of the entire unicast cell shows the low load at step S202, transmission power controlling unit 202 increases the transmission power of the multicast cell in step S204.

Here, the transmission power is calculated by using the formulae below.

$$P_{outer}(n+1) = \text{Median}(P_{max}, \alpha P_{outer}(n), P_{min}), P(0) = P0$$

$$P_{inner}(n+1) = \text{Median}(P_{max}, \beta P_{inner}(n), P_{min}), P(0) = P0$$

when power is decreased: $\alpha = \alpha 0, \beta = \beta 0$ when power is increased: $\alpha = 1/\alpha 1, \beta = 1/\beta 1$ $0 < \alpha 0, \alpha 1 < 1$
$0 < \beta 0, \beta 1 < 1$
$P_{max} = P0$
$P_{min} < P_{max}$ Here, Pouter(n) represents the transmission power of the multicast cells adjacent to the unicast cell at time n, and Pinner(n) represents the transmission power of the multicast cells which are not adjacent to the unicast cell at time n. Median(a, b, c) represents a function to return the median of variables a, b, c.

In the example of FIG. 1, base stations BS22~BS24, BS28 use Pouter(n), and the other base stations BS21, BS25~BS27 use Pinner(n). It is assumed that information on whether or not the multicast cell of the base station itself is adjacent to the unicast cell is previously set in transmission power controlling unit 202, so that transmission power controlling unit 202 can determine the formula to use in calculating the transmission power based on the information.

Now, the load status reporting operation by base stations BS11~BS14, which form the unicast cells, and the transmission power controlling operation by base stations BS21~BS28, which form the multicast cells, will be specifically described with reference to FIG. 5.

The operation by base stations BS21~BS28, which form the multicast cells, is the same whether or not they are adjacent to the unicast cells. Therefore, in FIG. 5, the transmission power controlling operation by base station BS24, which forms multicast cell C24 adjacent to unicast cell C11, is taken as an example. In this case, the load status of two unicast cells C11 and C12 is reported from base stations BS11 and BS12 to base station BS24, respectively. Here, it is assumed that $\alpha 0 = \alpha 1 = 0.5$, Pmin=P0/2.

Figure 5:
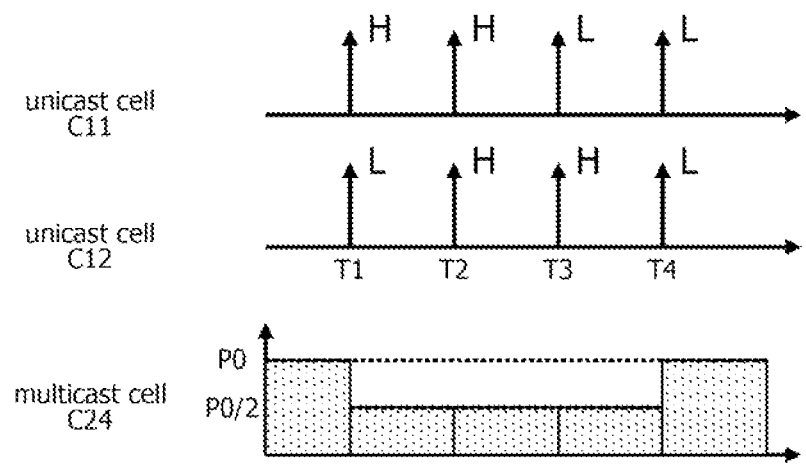
FIG. 5 is a diagram for explaining the load status reporting operation and the transmission power controlling operation by the base station according to the first exemplary embodiment of the present invention.

Referring to FIG. 5, load status reporting units 102 of base stations BS11, BS12 judge whether the load status is high or low by comparing the usage rates of the unicast cells C11, C12 of the base stations themselves with a predetermined value, and report the load status represented as H, if it is high, and the load status represented as L, if it is low, to base station BS24 on a predetermined cycle. Here, it is assumed that time T1 is the first report. The load status is represented as either one of the two values of H and L here, but the present invention is not limited to that and it can be represented as any of multiple values more than two.

At time T1, the load status of unicast cells C11 and C12 is H and L, respectively, and the load status of unicast cell C11 indicates high load; therefore, transmission power controlling unit 202 of base station BS24 decreases the transmission power of a downlink signal from multicast cell C24.

Similarly, at time T2 and T3, the load status of either unicast cell C11 or C12 is H to indicate the high load; therefore, transmission power controlling unit 202 of base station BS24 keeps the decreasing state of the transmission power of a downlink signal from multicast cell C24.

At time T4, the load status of both unicast cells C11 and C12 becomes L to indicate the low load; therefore, transmission power controlling unit 202 of base station B24 increases the transmission power of a downlink signal from the multicast cell C24.

As mentioned above, in the exemplary embodiment, base stations BS11 to BS14, which form the unicast cells, report the load status of the unicast cell of the base station itself to the base stations, which form nearby multicast cells within a certain distance from the unicast cells of the base stations themselves, and base stations BS21~BS28, which form the multicast cells, control the transmission power of a downlink signal from the multicast cell of the base station itself based on the load status of the nearby unicast cells.

Accordingly, since the multicast cells within a certain distance from the unicast cells are subject to decreasing transmission power, the interference from the multicast cells to the unicast cells can be reduced.

Further, since base stations BS21~BS28, which form the multicast cells, decrease the transmission power according to the load status of the nearby unicast cells, the present invention can prevent the base stations from always decreasing the transmission power, thus, prevent the multicast cells from always being made small.

Second Exemplary Embodiment

Since the configuration of the exemplary embodiment is the same as that of the first exemplary embodiment, the description of it will be omitted.

The exemplary embodiment is different from the first exemplary embodiment in the timing when base stations BS11~BS14, which form the unicast cells, report on the load status and in the timing when base stations BS21~BS28, which form the multicast cells, control the transmission power.

In the first exemplary embodiment, since base stations BS11~BS14, which form the unicast cells, regularly report on the load status on a predetermined cycle, base stations BS21~BS28, which form the multicast cells, receive the reports on the load status of the unicast cells at the same time.

On the other hand, in the exemplary embodiment, base stations BS11~BS14, which form the unicast cells, measure the load status on a predetermined cycle, but report on the load status only when the load status changes.

Base stations BS21~BS28, which form the multicast cells, control the transmission power only when they receive the report on the load status from any of the unicast cells. Here, the last reported values of the load status are used for the load status of the other unicast cells.

Now, the load status reporting operation by base stations BS11~BS14, which form the unicast cells, and the transmission power controlling operation by base stations BS21~BS28, which form the multicast cells, will be specifically described with reference to FIG. 6.

Figure 6:
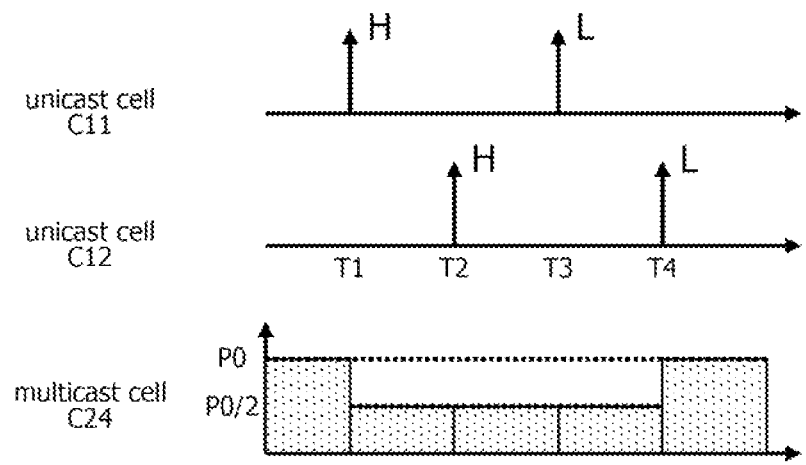
FIG. 6 is a diagram for explaining the load status reporting operation and the transmission power controlling operation by the base station according to a second exemplary embodiment of the present invention.

Like FIG. 5, in FIG. 6, the load status reporting operation by base stations BS11 and BS12, which form the unicast cells, and the transmission power controlling operation by base station BS 24, which form the multicast cell, are taken as an example. The measured values and the like are also the same as those in FIG. 5. It is assumed that the initial values of the load status of the unicast cells are low.

Referring to FIG. 6, load status reporting unit 102 of base station BS11 reports the load status to base station BS24 when the load status changes from L to H at time T1 and when the load status changes from H to L at time T3.

Load status reporting unit 102 of base station BS12 reports the load status to base station BS24 when the load status changes from L to H at time T2 and when the load status changes from H to L at time T4.

At time T1, the load status of unicast cells C11 changes to H to indicate the high load status; therefore, transmission power controlling unit 202 of base station BS24 decreases the transmission power of a downlink signal from multicast cell C24. Since the load status of either unicast cell C11 or C12 is H to indicate the high load status until time T4, the transmission power is not changed.

At time T4, the load status of both unicast cells C11 and C12 becomes L to indicate the low load; therefore, transmission power controlling unit 202 of base station B24 increases the transmission power of a downlink signal from the multicast cell C24.

As mentioned above, in the exemplary embodiment, base stations BS11 to BS14, which form the unicast cells, report the load status of the unicast cell of the base station itself when the load status changes, base stations BS21~BS28, which form the multicast cells, can control the transmission power by immediately responding to the change in the load status of the unicast cells.

The other advantages are the same as those of the first exemplary embodiment.

In the exemplary embodiment, it is assumed that the cycle of measuring the load status of base stations BS11~BS14, which form the unicast cells, is completely synchronized, but the present invention is not limited to that and the cycle of measuring may differ between base stations BS11~BS14.

Third Exemplary Embodiment

Figure 7:
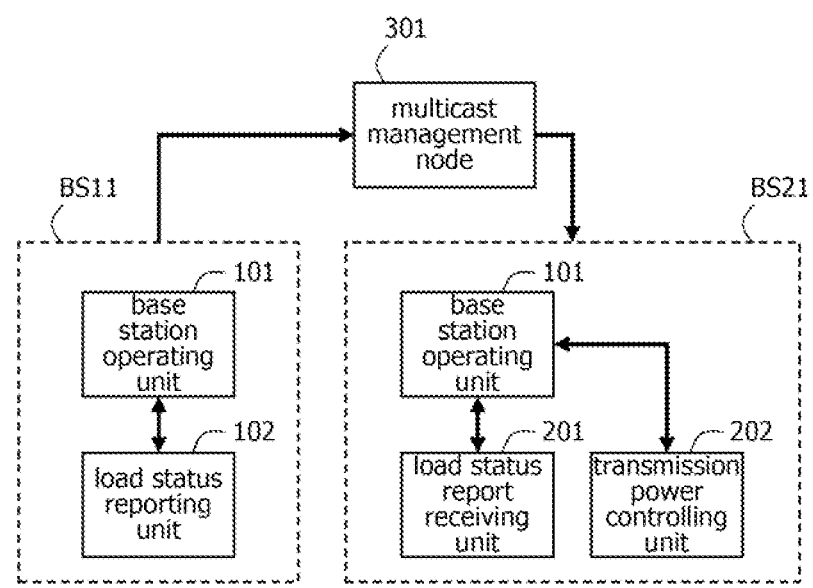
FIG. 7 is a diagram showing a configuration of the wireless communication system according to the third exemplary embodiment of the present invention.

Referring to FIG. 7, the wireless communication system according to the exemplary embodiment is different from the first and second exemplary embodiments in that multicast management node 301 is provided.

Multicast management node 301 is connected with base stations BS11~BS14 and BS21~B28 via a network, but the base stations other than BS11 and BS21 are omitted in FIG. 7.

Multicast management node 301 is a node for managing the multicast cell such that it intensively manages the control signal including the pilot signal in downlink and directs the signal to transmit from the multicast cell and the timing of transmission.

Base stations BS21~BS28 receive the direction from the multicast management node 301 and transmit the downlink signal from the multicast cell of the base station itself.

In the first and second exemplary embodiments, base stations BS11~BS14, which form the unicast cells, directly report the load status to the base stations, which form the nearby multicast cells, but they may report via multicast management node 301.

In that case, multicast management node 301 may previously set information on the multicast cell, for which the load status is to be reported, for each of base stations BS11~BS14 and transfer the report on the load status to the base station, which forms the multicast cell, based on the information.

When base stations BS21~BS28, which form the multicast cells, receive the reports on the load status transferred from multicast management node 301, they may control power as shown in the first and second exemplary embodiments.

As mentioned above, since only multicast management node 301 can intensively manage the control signals including the downlink pilot signal in the exemplary embodiment, base stations BS21~BS28, which form the multicast cells, need not communicate with each other.

If base stations BS11~BS14, which form the unicast cells, are adapted to report the load status of the unicast cells of the base stations themselves to the base stations, which form the nearby multicast cells, via multicast management node 301, information on the multicast cells to which the load status is to be reported need not be set.

The other advantages are the same as those of the first exemplary embodiment.

The present invention has been described with reference to the exemplary embodiments, but the present invention is not limited to these exemplary embodiments. Various modifications that can be recognized by those skilled in the art can be made to the configuration and details of the present invention within the scope thereof.

For example, although the RB usage rate is used in measuring the load status of the unicast cell in the first to third exemplary embodiments, the present invention is not limited to that and may use other indicators representing the operating state of the unicast cell. For example, it may use the average transmission power of all the downlink signals transmitted from base station BS to a terminal located in the unicast cell of the base station itself in a certain period or the number of terminals to which base station BS allocated RB (scheduling).

The method performed in base station BS of the present invention may be applied to a program to be executed by a computer. The program may be stored in a storage medium and may be provided to the outside via a network.

The invention claimed is:

1. A wireless communication system comprising a first base station forming a unicast area and a second base station forming a multicast area, wherein
said first base station comprises:
a load status reporting unit for reporting a load status of the unicast area of said first base station to said second base station forming the multicast area within a certain distance from the unicast area of said first base station, and
said second base station comprises:
a transmission power controlling unit for controlling, based on the reported load status of the unicast area, a transmission power of a signal transmitted in the multicast area of said second base station.

2. The wireless communication system according to claim 1, wherein, if the reported load status of at least one unicast area indicates a predetermined load or more than a predetermined load, the transmission power controlling unit decreases the transmission power of the signal transmitted in the multicast area of said second base station.

3. The wireless communication system according to claim 1, wherein, if the reported load status of all unicast areas indicates less than a predetermined load, the transmission power controlling unit increases the transmission power of the signal transmitted in the multicast area of said second base station.

4. The wireless communication system according to claim 1, wherein the load status reporting unit reports the load status of the unicast area of said first base station on a predetermined cycle.

5. The wireless communication system according to claim 1, wherein the load status reporting unit reports the load status of the unicast area of said first base station when the load status changes.

6. The wireless communication system according to claim 1, further comprising a management node for managing the multicast area, wherein
the load status reporting unit reports the load status of the unicast area of said first base station via the management node.

7. A base station forming a unicast area, comprising a load status reporting unit for reporting a load status of the unicast area of the base station itself to another base station forming a multicast area within a certain distance from the unicast area of the base station itself,
wherein said load status reporting unit reports the load status of the unicast area of the base station itself when the load status changes.

8. The base station according to claim 7, wherein said load status reporting unit reports the load status of the unicast area of the base station itself on a predetermined cycle.

9. The base station according to claim 7, wherein said load status reporting unit reports the load status of the unicast area of the base station itself via the management node that manages the multicast area.

10. A base station forming a multicast area, comprising a transmission power controlling unit for controlling, based on a load status of a unicast area reported from a base station forming the unicast area, the transmission power of a signal transmitted in the multicast area of the base station itself.

11. The base station according to claim 10, wherein, if the reported load status of at least one unicast area indicates a predetermined load or more than a predetermined load, said transmission power controlling unit decreases the transmission power of the signal transmitted in the multicast area of the base station itself.

12. The base station according to claim 10, wherein, if the reported load status of all unicast areas indicates less than a predetermined load, said transmission power controlling unit increases the transmission power of the signal transmitted in the multicast area of the base station itself.

13. A wireless communication method by a wireless communication system comprising a first base station forming a unicast area and a second base station forming a multicast area, comprising:
a load status reporting step in which the first base station reports the load status of the unicast area of the first base station to the second base station forming the multicast area within a certain distance from the unicast area of the first base station, and
a transmission power controlling step in which the second base station controls, based on the reported load status of the unicast area, the transmission power of a signal transmitted in the multicast area of the second base station.

14. A wireless communication method by a base station forming a unicast area, comprising a load status reporting step in which the base station reports a load status of the unicast area of the base station itself to another base station forming a multicast area within a certain distance from the unicast area of the base station itself, wherein, in said load status reporting step, the base station reports the load status of the unicast area of the base station itself when the load status changes.

15. The wireless communication method according to claim 14, wherein, in said load status reporting step, the base station reports the load status of the unicast area of the base station itself on a predetermined cycle.

16. The wireless communication method according to claim 14, wherein, in said load status reporting step, the base station reports the load status of the unicast area of the base station itself via a management node that manages the multicast area.

17. A wireless communication method by a base station forming a multicast area, comprising a transmission power controlling step in which the base station controls, based on the load status of a unicast area reported from a base station forming the unicast area, the transmission power of a signal transmitted in the multicast area of the base station itself.

18. The wireless communication method according to claim 17, wherein, in said transmission power controlling step, if the reported load status of at least one unicast area indicates a predetermined load or more than a predetermined load, the base station decreases the transmission power of the signal transmitted in the multicast area of the base station itself.

19. The wireless communication method according to claim 17, wherein, in said transmission power controlling step, if the reported load status of all unicast areas indicates less than a predetermined load, the base station increases the transmission power of the signal transmitted in the multicast area of the base station itself.

* * * * *